United States Patent [19]
Nakajima et al.

[11] Patent Number: 5,679,306
[45] Date of Patent: *Oct. 21, 1997

[54] METHOD OF MOLDING PREFORM IN INJECTION STRETCH BLOW MOLDING

[75] Inventors: Hisashi Nakajima, Sakaki-machi; Hideaki Koda, Ueda, both of Japan

[73] Assignee: A.K. Technical Laboratory, Inc., Japan

[*] Notice: The term of this patent shall not extend beyond the expiration date of Pat. No. 5,620,650.

[21] Appl. No.: 323,243

[22] Filed: Oct. 14, 1994

[30] Foreign Application Priority Data

Oct. 22, 1993 [JP] Japan ..................... 5-286193

[51] Int. Cl.$^6$ ..................... B29C 49/06; B29C 49/64
[52] U.S. Cl. ..................... 264/520; 425/526
[58] Field of Search ..................... 264/520, 532, 264/526

[56] References Cited

U.S. PATENT DOCUMENTS

| | | |
|---|---|---|
| 3,979,491 | 9/1976 | Zavasnik ..................... 264/520 |
| 4,020,137 | 4/1977 | Lachner et al. ..................... 264/520 |
| 4,235,837 | 11/1980 | Noonan ..................... 264/520 |
| 4,242,300 | 12/1980 | Valyi ..................... 264/520 |
| 4,285,657 | 8/1981 | Ryder ..................... 264/520 |
| 4,376,090 | 3/1983 | Marcus ..................... 264/532 |
| 5,364,585 | 11/1994 | Takeuchi ..................... 264/520 |

FOREIGN PATENT DOCUMENTS 53-047457  4/1978  Japan ..................... 264/520

*Primary Examiner*—Catherine Timm
*Attorney, Agent, or Firm*—Ostrolenk, Faber, Gerb & Soffen, LLP

[57] ABSTRACT

A method of molding a preform in an injection stretch blow molding, wherein a gas is entered into the boundary between the preform and an injection core so that the gas pressure causes the preform in an injection mold to be insulated from the injection core, thereby allowing a high-temperature releasing of the preform.

11 Claims, 3 Drawing Sheets

METHOD OF MOLDING PREFORM IN INJECTION STRETCH BLOW MOLDING

BACKGROUND OF THE INVENTION

1. Field of the Invention

The present invention relates to a method of molding a preform employable where an injection molded preform is stretch blow molded to a molded product.

2. Background Art

Injection stretch blow molding is a method by which an injection molded preform is released from an injection mold and an injection core, and transferred to a blowing mold where the portion below the neck portion (also called a mouth portion) of the preform fixedly held by a neck mold is biaxially stretched and expanded by a stretching rod and blowing air to form a container such as a bottle having a thin-wall-thickness body; the stretch blow molding step is performed either after the released preform is temperature conditioned, or immediately after the preform is released without being conditioned.

In either case, the stretch blow molding step is performed in a state in which the thermal energy of the molten resin generated during injection molding is thermally maintained in the preform, so that it is considered desirable that the preform is at a temperature as high as possible, and therefore the preform is released from the injection mold as early as possible.

The term "releasing a preform in a high temperature state" described in the present invention refers to a releasing of a preform wherein an intermediate state in which the internal portion of the preform still exhibits a high-temperature and an unsolidified state, and in which the shape of the preform is kept by its skin layer; the surface temperature of the preform after being released increases due to internal heat over time up to a peak value, and then decreases slowly.

This high-temperature releasing cannot be easily performed for all molding materials, and for some molding materials, it is difficult to perform by conventional means even if the draft of the injection core is set to an allowable limit. Polyethylene terephthalate (PET) used widely as the molding material of thin-wall-thickness packaging containers has been easy to release; polypropylene (PP), polycarbonate (PC) and the like have been difficult to release; and polyethylene (PE) has been very difficult to release.

Generally, when a molten resin is injected and charged into an injection cavity formed by an injection mold and an injection core, the inner and outer surfaces of the molten resin come contact with the already-cooled cavity surface and injection core surface to cause them to be solidified due to quenching, thereby forming a skin layer. The skin layer increases in thickness with time and develops a contraction accordingly. The contraction causes the inner surface of the preform formed therein to come closely contact with the injection core surface and the other hand, the outer surface to be separate from the cavity surface.

This further causes the inner surface of the preform to be more cooled than the outer surface, thereby providing a state in which the preform holds strongly on to the injection core. Polypropylene and polyethylene have a stronger tendency to such a state than polyethylene terephthalate, and in particular, for polyethylene, its release is difficult at a high temperature and can be performed only after the skin layer is formed to a sufficient thickness, so that in performing the stretch blow molding after releasing, an uneven wall thickness is apt to develop, thus providing a state in which good quality thin-wall-thickness containers cannot yet be mass produced by the stretch blow molding.

For polypropylene, when used for the preform of products for which the injection core draft can be set to a large value, such as the preform of wide-mouth bottles having a large mouth diameter, high-temperature releasing can be relatively easily performed, while when used for the preform of ordinary packaging bottles which are in a greatest demand, and for which the draft is limited to a small value due to their small mouth diameter, a highly skilled technique is required in performing the releasing, and also there is a problem with their yield, so that the performing of the releasing is limited to some cases.

For polyethylene terephthalate used for molding material, when the temperature distribution of a preform is performed by the adjustment of wall thickness, the injection core surface is partially and smoothly cut to increase the wall-thickness of the preform. However, the cutting depth on the injection core surface has a certain limit such that the depth is no more than about 0.2 mm for a draft of about 1°, so that if the surface is cut to a depth deeper than that value, withdrawal of the injection core becomes difficult when releasing the preform, thereby causing the shape of the preform to be marred. Thus, the adjustment of temperature distribution by increasing the wall thickness is subjected to a certain limit.

The present invention is made considering the above circumstances, and it is an object of the present invention to provide a method of molding a preform in a novel injection stretch blow molding in which during the injection molding of the preform, air pressure is utilized to insulate the preform from an injection core, thereby allowing high-temperature releasing, and thus allowing the stretch blow molding of molding materials which has been difficult to perform, as well as the adjustment of temperature distribution by increasing the wall thickness to be easily performed.

SUMMARY OF THE INVENTION

A feature of the present invention according to the above-mentioned object exists in that in a method of molding a preform in an injection stretch blow molding wherein an injection molded preform is released in a high temperature state from an injection mold and an injection core with being held by a neck mold, and the released preform is stretch blow molded to a molded product either immediately after the injection molded preform is released or after the released preform is conditioned by heating, characterized in that the method further comprises the steps of forcedly injecting a gas having a predetermined pressure into the boundary between the preform formed by injecting a resin in an injection cavity and the injection core so as that the gas pressure causes the inner surface of the preform to be insulated from the surface of the injection core and the preform is urged against the cavity surface, thereby performing a cooling step for producing a skin layer of the preform, and releasing the preform in a state where the inner surface of the preform is insulated from the surface of the injection core.

Another feature of the present invention exists in that the forcing of the gas into the boundary between the preform and the injection core is started after pressure holding step is completed, and stopped before the preform is released but after the cooling for producing a skin layer of the preform is completed, and preferably in that the forcing is started at the same time as the cooling step time is started, and stopped at the same time as the cooling step time is ended.

For the preform in the cavity immediately after the pressure holding step is completed, except for the thin-wall-thickness neck and bottom portions, only its inner and outer surfaces are in contact with the cavity surface and the core surface is cooled and solidified to form a skin layer, and its internal portion is still at a high temperature and thus in a flexible state as a whole, so that the gas forced between the injection core and the preform extends the preform, thereby causing the preform to be urged against the cavity surface.

This causes the inner surface of the preform to be apart from the core surface and the outer surface thereof to be in close contact with the cavity surface, so that the outer surface is more apt to cool than the inner surface, and the preform is insulated from the injection core to prevent the preform from holding strongly on to the injection core, whereby the releasing at a high temperature becomes easier.

DETAILED DESCRIPTION OF THE PREFERRED EMBODIMENTS

Figure 1:
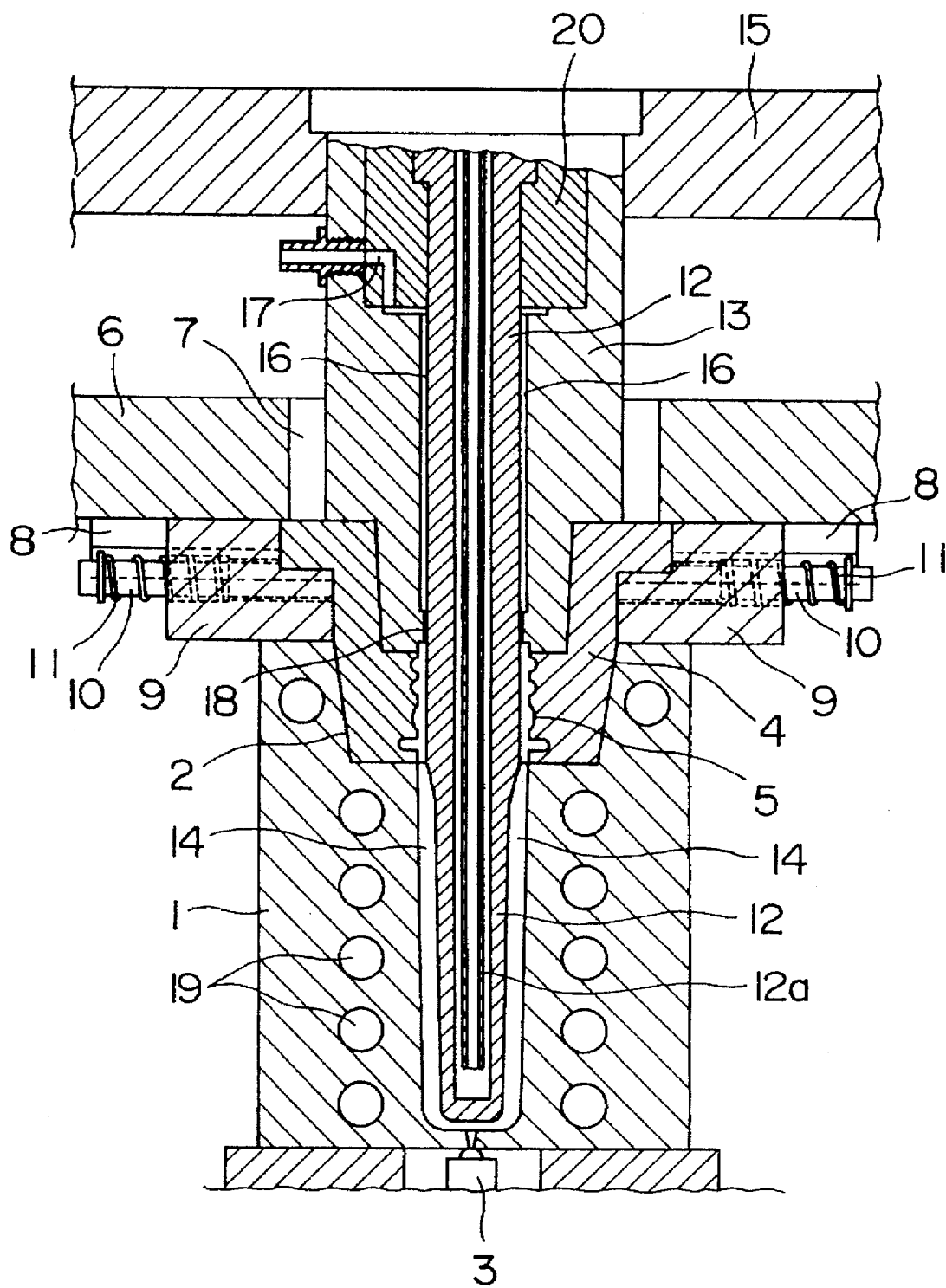
FIG. 1 is a longitudinal sectional view of a mold equipment during mold closing used for a preform molding method of the present invention.

In FIG. 1, the numeral 1 indicates an injection mold for molding a preform fixed on a machine base side, which has an opening 2 of a cavity at its upper portion, and at whose bottom portion an injection nozzle 3 touches through its nozzle. The numeral 4 indicates a conical, trapezoidal neck mold comprising a pair of right/left split molds which serves also as a holder of the preform. The neck mold 4 has a concave sectional shape, a large-diameter hole at its lower part, and a wall surface 5 of the hole on which a shape such as the thread or support ring of a molded product has been engraved.

The above-mentioned neck mold 4 is provided on the lower side of an inserting through hole 7 on the panel surface of a transfer panel 6. The transfer panel 6 is disposed so that it is movable upward/downward and horizontally with respect to the injection mold 1. On the lower side surface of the transfer panel on the both sides of the above-mentioned inserting through hole 7, there is provided a pair of guide members 8 (only one side is shown in FIG. 1), to which base plates 9, 9 mounting the split molds of the above-mentioned neck mold 4 are fitted insertedly at its both ends and openably mounted.

In the both sides of the base plates 9, 9, there is penetrated a connecting shaft 10, and spring members 11, 11 which elastically always press inwardly to cause the neck mold 4 to be kept closed are disposed between the ends of the connecting shaft 10 and the base plates 9, 9. The spring members 11, 11 can be compressed through the base plates 9, 9 by pushing of a wedge-shaped opening member (whose view is omitted) from the upper side into a slot formed on the both sides of the abutting portions of the base plates 9, 9. This causes the base plates 9, 9 to be moved outwardly, thereby opening the neck mold 4.

The numeral 12 indicates an injection core which has a cooling path 12a therein. The injection core 12 is fixedly secured downward by being fitted insertedly in the central portion of a core holding member 13 disposed upward/downward movably and relatively above the upper portion of the above-mentioned neck mold 4. The length protruded from the core holding member 13 comprises a length in which its head penetrates through the above-mentioned neck mold 4 and is arranged near the cavity bottom of the injection mold 1, whereby an injection cavity 14 for molding the preform is formed along the neck mold 4 through the injection mold 1.

The above-mentioned core holding member 13 is fixed to the lower side surface of a mold clamping panel 15 provided upward/downward movably above the upper side of the transfer panel 6, and its head through which the injection core 12 protrudes is formed to provide a convex shape so as to be fitted into the concave portion of the above-mentioned neck mold 4.

On the periphery of the holding portion of the injection core 12 fitted insertedly into the central portion of the core holding member 13, there is provided a gas flowing through gap 16 which is opened at the head of the core holding member 13 to communicate with the above-mentioned injection cavity 14. The gas flowing through gap 16 is connected with a gas path 17 bored on the core holding member side, thereby allowing the gas to be blown into the injection cavity 14.

Examples of the gas employable in the present invention are, for example, air, nitrogen gas, and the like.

A gap 18 is provided in the above-mentioned gas flowing through gap 16 in order to prevent the molten resin injected and charged into the injection cavity 14 from entering into the gap and then remaining as burr, and it is desirable that the gap 18 dimension is limited to 3/100 mm or less.

The numeral 19 indicates a cooling path in the injection mold 1; and the numeral 20 indicates a core fixing member provided in the upper portion of the core holding member 13. At all times, a coolant (e.g. cooling water and the like) flows through the cooling path 19 and the cooling path 12a of the above-mentioned injection core 12.

The injection molding of the preform using the above-mentioned mold equipment will be explained hereinafter. With respect to the injection mold 1 which is in a fixed state and has already been cooled to a required temperature by the coolant flowing through, the above-mentioned transfer panel 6 and the mold clamping panel 15 are caused to descend; the injection mold 1 and the neck mold 4 are mold closed as shown in FIG. 1; and then the injection core 12 is inserted from the upper side of the neck mold into the cavity to form the injection cavity 14.

Figure 2:
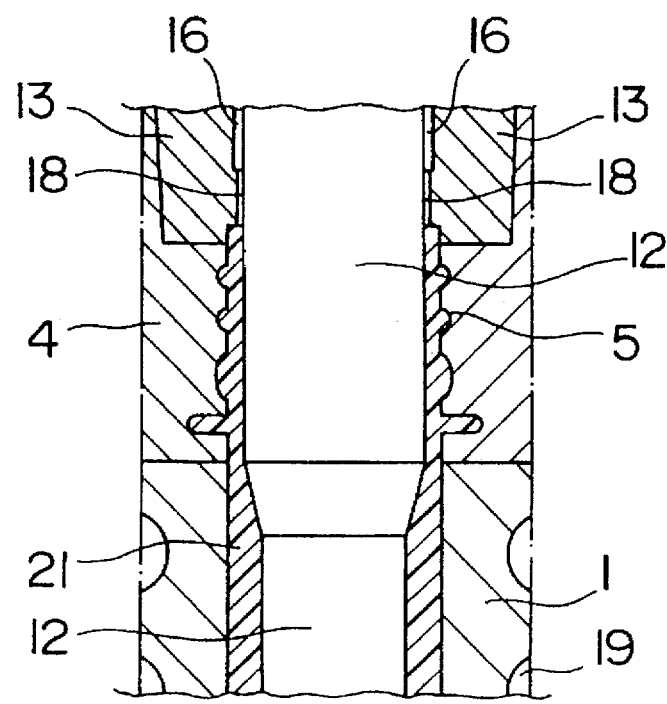
FIG. 2 is a partly longitudinal sectional view of an injection cavity upper portion showing the molding state of a preform.

With the mold clamping panel 15, the core holding member 13 is pressed against the neck mold 4, and then a molding material of, a molten-state thermoplastic resin, is injected and charged through the nozzle 3 into the injection cavity 14. As shown in FIG. 2, the molding material charged up to the head face of the core holding member 13 causes a preform 21 to be formed. When the injection charging step is completed, the molding process proceeds to the pressure holding step.

At the time when the pressure holding step is completed, the process proceeds to the cooling step to start time counting. At the same time as the start of time counting, a valve (not shown) in a supply circuit of a compressor is opened, so that a compressed gas having a required pressure is supplied through a gas path 17 on the core holding member side to the above-mentioned gas flowing through gap 16.

The above-mentioned cooling is performed by the coolant flowing through both the injection mold 1 and the injection core 12. For the reason that the neck portion of the preform 21 is to be left injection molded, and penetration of a stretching rod is to be prevented at its bottom, for some molding materials, the temperature of the portion may be set to a value lower than that of the body portion requiring the stretch blow molding.

For the preform 21 in the cavity immediately after the pressure holding step is completed, except for the thin-wall-thickness neck and bottom portions, only its inner and outer surfaces being in contact with the cavity surface and the core surface are cooled and solidified to form a skin layer, and its internal portion is still at a high temperature and thus in an intermediate state before being solidified. Thus, the preform 21 is in a flexible state as a whole, and not completed to withstand an outer pressure, so that the gas of the gas flowing through gap 16 goes through the preform opening into the bottom portion in such a manner that the gas goes through the opening gap 18 and along the injection core 12 to extend along said preform 21 at the boundary between the injection core 12 and the preform 21.

Figure 3:
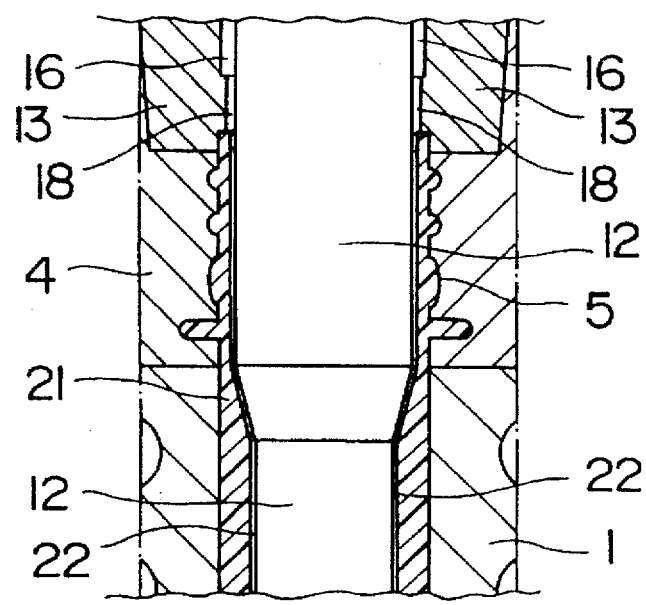
FIG. 3 is a partly longitudinal sectional view of an injection cavity upper portion showing a gas layer between an injection core and a preform.

As a result, the inner surface from the neck portion to the bottom portion of the preform 21 is apart from the core surface, thereby developing an insulation therein. The gas pressure forced into the boundary between the injection core 12 and the preform 21 causes the preform 21 to be urged against the cavity surface. The air on the boundary keeps this state until the gas supply is stopped, thereby forming an insulation layer 22 as shown in FIG. 3. Contrary to prior art, this causes the inner surface to be apart from the core surface and the outer surface to be in close contact with the cavity surface, so that the outer surface is more apt to cool than the inner surface.

The cooling of the above-mentioned preform 21 is completed at the time when the preform 21 can keep its shape by the skin layer developed on the inner/outer surfaces, and can be transferred to a blowing mold by being held at its already-solidified neck portion with the neck mold 4. At the same time as the cooling time is up, the supply of compressed gas is stopped with the valve closed.

Immediately after the cooling step is completed, the preform 21 is released. The releasing is performed by ascending the mold clamping panel 15 and pulling out the injection core 12 upward. The releasing is performed using the neck mold 4 as a counterforce in the state in which it holds the neck portion, so that in a state in which the preform 21 holds strongly on to the injection core 12, the preform 21 is drawn through the neck mold 4 to be deformed to a short length, while in the state in which the preform 21 has already been insulated from the injection core 12 in the injection mold according to the present invention, the releasing is smoothly performed even when the preform 21 is in a flexible state.

Figure 4:
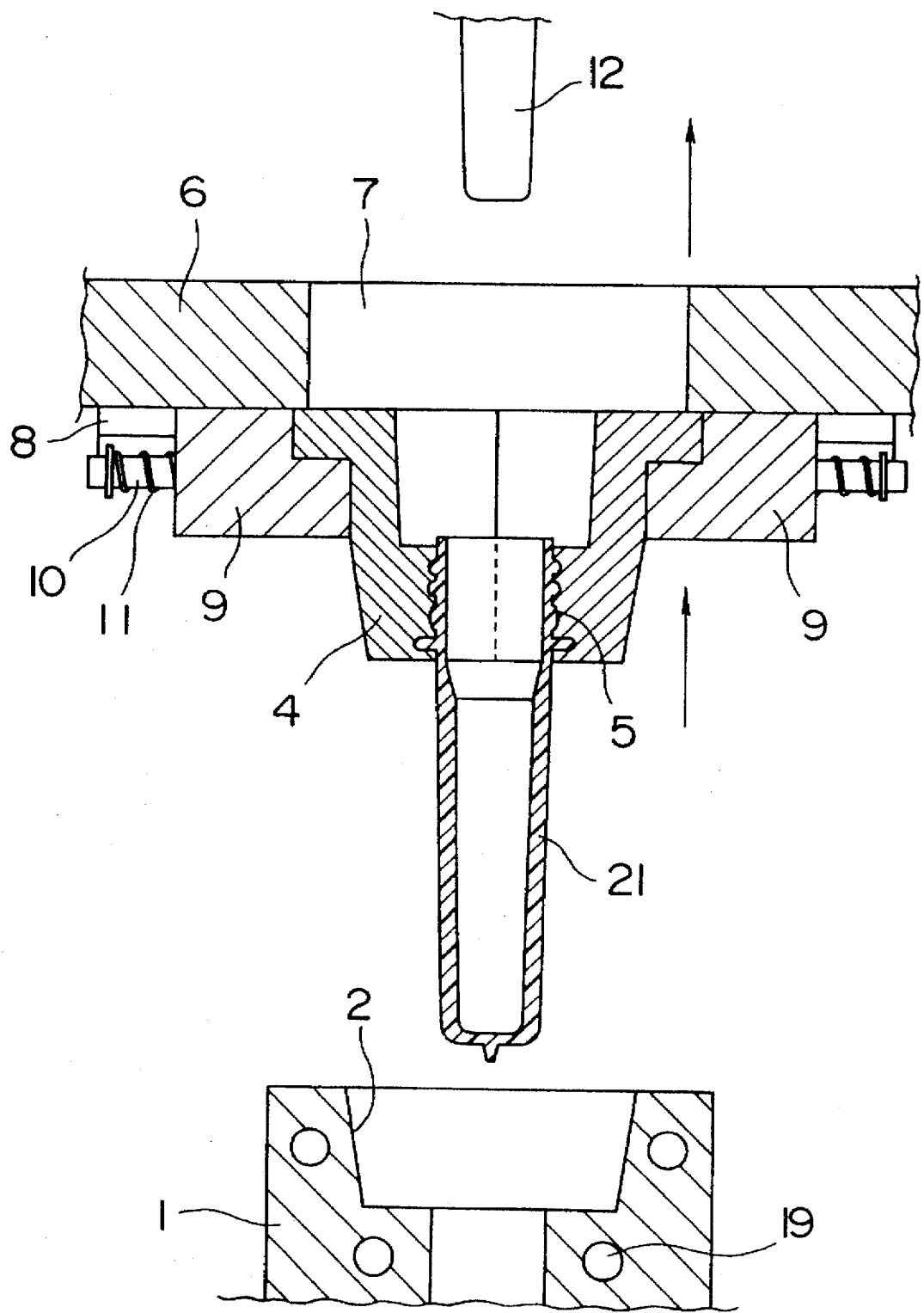
FIG. 4 is a partly longitudinal sectional view of a mold equipment showing the releasing state of a preform.

The insulation layer 22 communicates with outside air by a little upward movement of the injection core 12. This causes the gas pressure remaining there to be lost, so that the original flexible preform 21 shape tends to be. However, the restoring force is not so large as to hold on to cause a strong the injection core 12, and the urging force against the cavity surface has been removed, so that the next step of releasing from the injection mold 1 is smoothly performed by ascending of the transfer panel 6 (see FIG. 4).

In this manner, the shape and wall thickness distribution of the preform 21 whose neck portion is held by the neck mold 4 are made as designed, and the preform can be transferred as it is to the next temperature adjusting position or to the position of the blowing mold by horizontal moving of the transfer panel 6.

In a molding method requiring temperature adjustment for the above-mentioned preform after being released, the preform is housed in a temperature adjusting pot in which the temperature of each portion of the preform is adjusted according to the magnitude of the expansion coefficient due to the stretch blow molding, and then transferred to the blowing mold to perform the stretch blow molding.

In a molding method by which the stretch blow molding is performed immediately after releasing, the amount of internal heat for each portion of the preform when being formed has been adjusted by adjusting of wall thickness distribution, so that the stretch blow molding is performed within the time before the amount of internal heat is lost to cause the temperature of the preform to become uniform as a whole (that is, before the surface temperature reaches a peak value).

In either of the above-mentioned molding methods, the high-temperature releasing allows a high-quality thin-wall-thickness bottle to be formed, and the stretch blow molding with a molding material whose molding has previously been difficult to be performed.

Although the illustrated embodiment comprises a composition in which the transfer panel 6 is upward/downward moved with respect to the injection mold 1, there may be used a composition in which on the contrary, the injection mold is upward/downward moved with respect to the transfer panel.

EXAMPLES

[Molding example No. 1]

| Molding material: | polyethylene, polypropylene | | |
|---|---|---|---|
| Molded product: | 500 ml-milk bottle | | |
| Preform | Wall thickness (mm) | Length (mm) | Weight (g) |
| A | 3.0 | 108 | 32.0 |
| B | 4.5 | 69 | 29.8 |

| Injection temperature (cylinder temperature) (°C.) | |
|---|---|
| Nozzle | 175 |
| Front portion | 215 |
| Intermediate portion | 215 |
| Rear portion | 185 |

| Injection pressure (pump setting pressure) (kg/cm$^2$) | |
|---|---|
| Primary pressure (charging) | 140 |
| Secondary pressure (pressure holding) | 42 |

| Injection core draft | |
|---|---|
| A | 0.79° |
| B | 1.25° |

| Mold temperature | |
|---|---|
| Injection core (set temperature °C.) | 80 |
| Injection mold (set temperature °C.) (corresponding portion of preform) | |
| Upper portion (Neck portion) | 12 |
| Intermediate portion (Body portion) | 80 |
| Lower portion (Bottom portion) | 12 |
| Injection charging time (sec) | 1.5–1.8 |
| Pressure holding time (sec) | 4.7–5.0 |
| Cooling time (after pressure holding completion, sec) | 1.8–3.0 |
| Gas blowing time (same as above) | 1.8–3.0 |
| Blowing gas pressure (kg/cm$^2$) | 9.0 |
| Releasing temperature (surface temperature °C.) (during stretch blow molding, 115–125) | 80–90 |

[Molding example No. 2]

Molding material: polyethylene terephthalate
Molded product: 500 ml-packaging bottle (for water or oil)

| Preform Wall thickness (mm) | Length (mm) | Weight (g) |
| --- | --- | --- |
| 2.3 | 121 | 24.5 |

| Injection temperature (cylinder temperature) (°C.) | |
| --- | --- |
| Nozzle | 280 |
| Front portion | 280 |
| Intermediate portion | 280 |
| Rear portion | 275 |

| Injection pressure (pump setting pressure) (kg/cm$^2$) | |
| --- | --- |
| Primary pressure (charging) | 140 |
| Secondary pressure (pressure holding) | 50 |
| Injection core draft | 1.0° |

| Mold temperature | |
| --- | --- |
| Injection core (set temperature °C.) | 13~15 |
| Injection mold (set temperature °C.) 13~15 | |
| Injection charging time (sec) | 0.7~1.0 |
| Pressure holding time (sec) | 2.6~2.9 |
| Cooling time (after pressure holding completion, sec) | 1.0 |
| Gas blowing time (same as above) | 1.0 |
| Blowing gas pressure (kg/cm$^2$) | 9.0 |
| Releasing temperature (surface temperature °C.) | 60~70 (during stretch blow molding, 80~90) |

The present invention performs the injection molding of a preform as described above, so that the invention exhibits the following effects:

Where the molding materials are polyethylene terephthalate, polycarbonate, polypropylene and the like, the releasing can be performed earlier than with prior art, so that the injection molding time from injection charge starting to preform releasing is shortened and the molding cycle time is also shortened to improve the molding efficiency and almost eliminate loss during releasing, thereby reducing the molding cost.

The adjustment of the amount of internal heat by increasing/decreasing of the preform wall thickness becomes easier than with prior art, so that even a packaging container having an irregular shape which provides a large difference in partial expansion coefficient can be formed by the stretch blow molding, and a flat container and the like can also be easily formed.

Even polyethylene can be used as a molding material which has been considered difficult to form a thin-wall thickness container by the stretch blow molding method, and the stretch blow molding from a preform to a thin-wall-thickness packaging container can be performed by employing a conventional technique, so that the manufacturing cost becomes not so high, and the amount of material used is significantly reduced compared to a thick-wall-thickness container by the blow molding method, thereby saving material and reducing the product cost.

The employment of the preform molding method according to the present invention allows the application of thermoplastic resins to packaging containers to be expanded, whereby packaging containers using a molding material suitable for their contents can be mass produced by the stretch blow molding.

What is claimed is:

1. In a method of injection stretch blow molding wherein an injection molded preform is released in a high temperature state from an injection mold and an injection core while being held by a neck mold, and the released preform is stretch blow molded to a molded product immediately after the injection molded preform is released the improvement which comprises the steps of forcing a gas having a predetermined pressure into the boundary between the preform formed by injecting a resin in an injection cavity and the injection core so that the gas pressure causes an inner surface of the preform to be insulated from a surface of the injection core and the preform to be urged against the cavity surface, thereby performing a cooling step for producing a skin layer on the high temperature preform; and releasing the preform from the injection mold in a state where the inner surface of the preform is insulated from the surface of the injection core.

2. A method of injection stretch blow molding as set forth in claim 1 wherein the forcing of the gas into the boundary between the preform and the injection core is started after injection pressure holding step is completed, and stopped before the preform is released but after the cooling step for producing the skin layer of the preform is completed.

3. A method of injection stretch blow molding as set forth in claim 1 wherein the forcing of the gas into the boundary between the resin and the injection core is started when the cooling step for producing the skin layer of the preform is started and is stopped when the cooling step for producing the skin layer of the preform is completed.

4. A method of injection stretch blow molding as set forth in claim 1 wherein the preform is polypropylene.

5. A method of injection stretch blow molding as set forth in claim 1 wherein the preform is polycarbonate.

6. A method of injection stretch blow molding as set forth in claim 1 wherein the preform is polyethylene.

7. A method of injection stretch blow molding comprising the steps of:

injection molding a predetermined preform by filling an injection mold comprising a cavity die, a core die and a neck mold with molten molding resin, forcing a gas having a predetermined pressure into the boundary between the preform and the injection core so that the gas pressure causes the inner surface of the preform to be insulated from the surface of the injection core and the preform to be urged against the cavity surface, thereby performing a cooling step for producing a skin layer on the high temperature preform, releasing the preform in a high temperature state from the injection mold while the preform is in a state where the inner surface of the preform is insulated from the surface of the injection core, and while the preform is being held by the neck mold, and immediately after the injection molded preform is released, biaxially stretching and expanding the preform employing a stretching rod and blowing air into the form of a hollow thin-walled product.

8. A method of injection stretch blow molding as set forth in claim 7 wherein the forcing of the gas into the boundary between the resin and the injection core is started when cooling for producing the skin layer of the preform is started and is stopped when the cooling step for producing the skin layer of the preform is completed.

9. A method of injection stretch blow molding as set forth in claim 7 wherein the preform is polypropylene.

10. A method of injection stretch blow molding as set forth in claim 7 wherein the preform is polycarbonate.

11. A method of injection stretch blow molding as preform as set forth in claim 7 wherein the preform is polyethylene.

* * * * *